United States Patent [19]
Froidevaux

[11] Patent Number: 5,269,185
[45] Date of Patent: Dec. 14, 1993

[54] SENSOR FOR MEASURING A PHYSICAL PARAMETER

[75] Inventor: Raymond Froidevaux, Boudry, Switzerland

[73] Assignee: Asulab S.A., Bienne, Switzerland

[21] Appl. No.: 760,481

[22] Filed: Sep. 16, 1991

[30] Foreign Application Priority Data

Sep. 17, 1990 [FR] France .................. 90 11529

[51] Int. Cl.$^5$ .................. G01D 3/00; G01D 11/16
[52] U.S. Cl. .................. 73/430; 73/517 AV; 73/526; 73/862.639
[58] Field of Search .................. 73/430, 526, 866.5, 73/866.1, 493, 496, 514, 517 R, 522, 707, 753, 862.621, 862.629, 862.632, 862.633, 862.634, 862.636, 862.637, 862.638, 862.639, 517 AV

[56] References Cited

U.S. PATENT DOCUMENTS

| | | | |
|---|---|---|---|
| 3,778,572 | 12/1973 | Matsui | 200/61.45 M |
| 3,893,342 | 7/1975 | Florian | 73/517 R |
| 4,234,049 | 11/1980 | Oliver | 177/105 |
| 4,640,128 | 2/1987 | Lewis | 73/866.5 |
| 4,811,604 | 3/1989 | Browning | 73/517 R |
| 4,882,933 | 11/1989 | Petersen et al. | 73/517 R |
| 4,918,987 | 4/1990 | Vescial et al. | 73/517 R X |
| 4,926,689 | 5/1990 | Hanson | 73/517 R X |
| 5,165,279 | 11/1992 | Nolling et al. | 73/517 AV |
| 5,186,053 | 2/1993 | Egley et al. | 73/517 AV X |

FOREIGN PATENT DOCUMENTS

| | | |
|---|---|---|
| 0247247 | 12/1987 | European Pat. Off. . |
| 0373040 | 6/1990 | European Pat. Off. . |
| 1817946 | 10/1974 | Fed. Rep. of Germany . |
| 2176607 | 12/1986 | United Kingdom . |

OTHER PUBLICATIONS

Article entitled "Tensometric accelerometers with overload protection" by L. M. Moskalik, *Measurement Techniques*, vol. 22, No. 12, pp. 1469-1471, Dec. 1979.

*Primary Examiner*—Tom Noland
*Attorney, Agent, or Firm*—Pollock, Vande Sande & Priddy

[57] ABSTRACT

A sensor for measuring a physical parameter is described having a frame, at least one support which is resiliently flexible under the influence of a physical parameter and which is integral with the frame, and at least one resonator integral with the support for supplying a signal representative of the physical parameter in response to flection of the support, the sensor also having an abutment and counter abutment limiting the flextion of the support, in particular before it is fixed to the frame. This sensor has applications in the measurement of a physical parameter such as, for example, acceleration.

15 Claims, 3 Drawing Sheets

SENSOR FOR MEASURING A PHYSICAL PARAMETER

FIELD OF THE INVENTION

The invention relates to sensors for measuring physical parameters.

More specifically it relates to a sensor of the type having a support which is resiliently flexible under the influence of external stress such as acceleration and which is in particular adapted to receive detection means responsive to this stress.

DESCRIPTION OF THE PRIOR ART

Sensors provided with flexible supports of this type are already known. Sensors of this type have been used for a long time in instruments measuring forces, such as balances, or in instruments for measuring other physical parameters such as pressure or acceleration. These latter applications have, moreover, proved very valuable in the automotive field where these sensors are located in suitable parts of a vehicle to measure the acceleration undergone by the latter and to consequently modify certain parameters or trigger various safety devices.

In their simplest form, sensors of this type comprise a flexible support substantially having the shape of a beam of rectangular section fixed in overhanging manner onto a frame. This flexible support which is designed to deflect along at least one sensitive axis in response to external stress has a transducer. This transducer is fixed to a large face of the flexible support equidistant from one or other of its extremities. When the beam is flexed the transducer, which is, for example composed of a quartz resonator in the shape of a double tuning fork, sends signals in the form of frequency variations towards a signal treatment circuit. One or more other transducers are often used to reduce the effects of interference (temperature).

In this type of sensor, before being fitted to the frame the support is already equipped with its transducers. The latter are firmly fixed to the support to give maximum sensitivity to detect the slightest movement of the support with the result that, in the case of quartz transducers, the transducers often break during handling before and during installation since they are extremely fragile.

This risk of damage consequently makes it necessary to set up additional inspections in order to avoid installing defective sensors in their respective frames. Moreover, damage of this kind is not easily detected with the naked eye, thus making it necessary to use inspection instruments.

It should be noted that inspection steps of this kind are all the more necessary since these sensors are generally intended for automobiles or other vehicles for passenger transport in which they give information which could have a direct effect on the safety of these passengers.

OBJECTS OF THE INVENTION

It is thus an object of the invention to overcome this disadvantage by providing a sensor for measuring a physical parameter capable of being manipulated during its installation without the risk of damage to the transducers mounted thereon.

BRIEF SUMMARY OF THE INVENTION

The invention thus relates to a sensor for measuring a physical parameter of the type comprising:

at least one support, said support having a base adapted to be mounted on said frame and from which extends an elongated member capable of flexing in relation to the base under the action of said physical parameter, a mass integral with the elongated member of said frame comprising a cavity closely surrounding the mass, detection means integral with said elongated member capable of supplying a signal representative of said physical parameter, and means for limiting the flexion of said elongated member, in particular before its mounting on the frame, wherein the limiting means comprise at least one arm integral with the base and extending parallel to and adjacent to the elongated member, the extremity of said arm also extending into a space provided in said mass.

Due to these features, flexion of the support is advantageously controlled by the elongated member which limit flexion of the elongated member and consequently limit the stress on the detection means thereof up to a predetermined rupture-resistance threshold without extensively increasing the cumbersomeness of the sensor.

According to one embodiment, the elongated member is formed by an overhanging beam extending from the base and where said mass is formed by two assembled parts between which a space is provided into which said arm extends, this space defining the amplitude of maximum flexion of said elongated member.

The invention also relates to a sensor for measuring a physical parameter of the type comprising:

a frame, at least one support, said support having a base adapted to be mounted on said frame and from which extends an elongated member capable of flexing in relation to the base under the action of said physical parameter, detection means integral with said elongated member adapted to provide a signal representative of said physical parameter, and means form limiting the flexion of said elongated member wherein said limitation means comprise at least one arm integral with the base, said arm extending parallel to and adjacent to the elongated member and comprising at least one wing which extends therefrom, said wing being integral with said arm or located thereon.

BRIEF DESCRIPTION OF THE DRAWINGS

Other features and advantages of the present invention will appear from study of the following detailed description of two embodiments of the invention, given by way of non limiting example, with reference to the accompanying drawings in which.

DETAILED DESCRIPTION OF THE INVENTION

Figure 1:
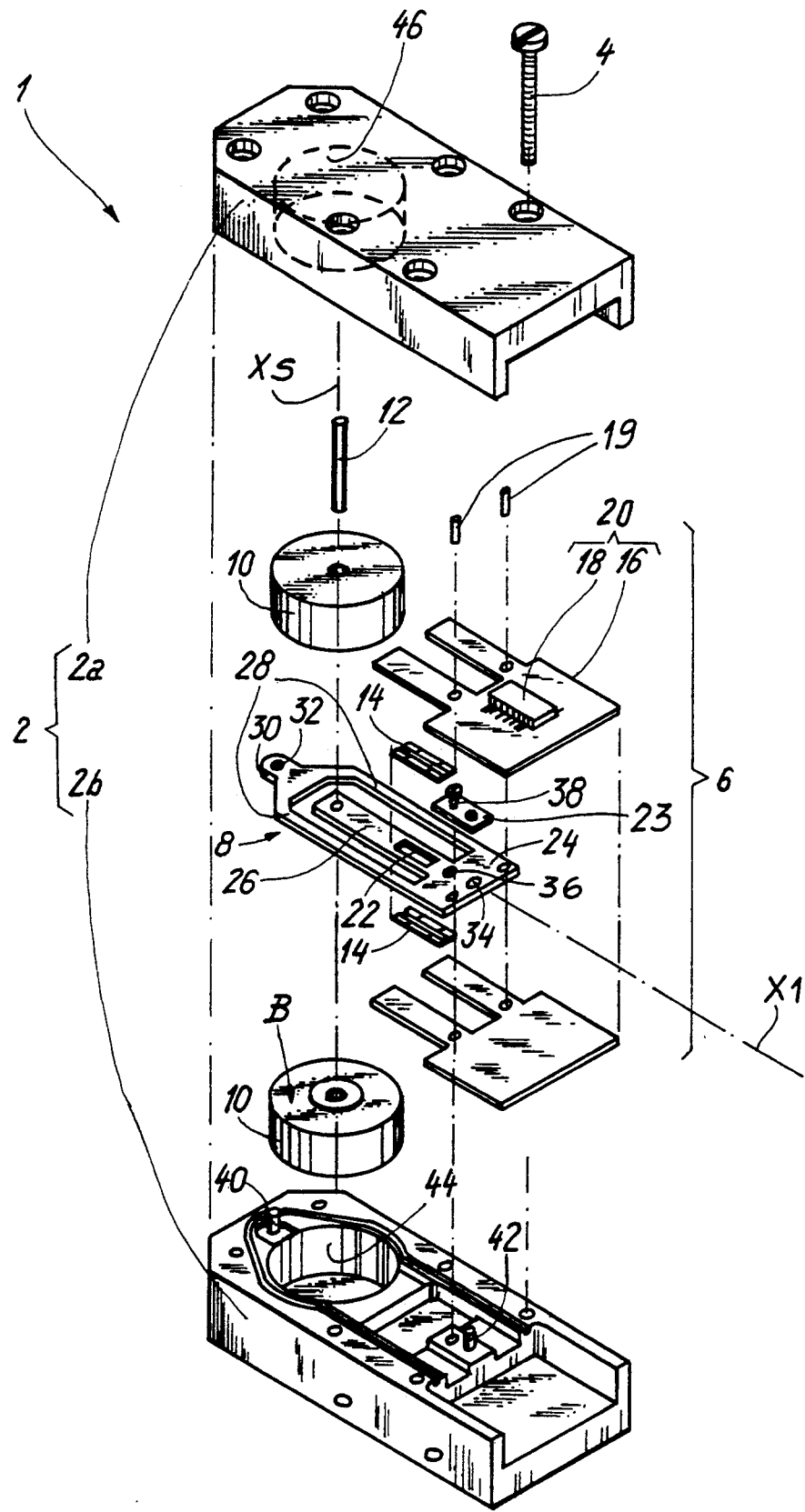
FIG. 1 is an exploded perspective view of a measurement sensor of the invention.
Figure 2:
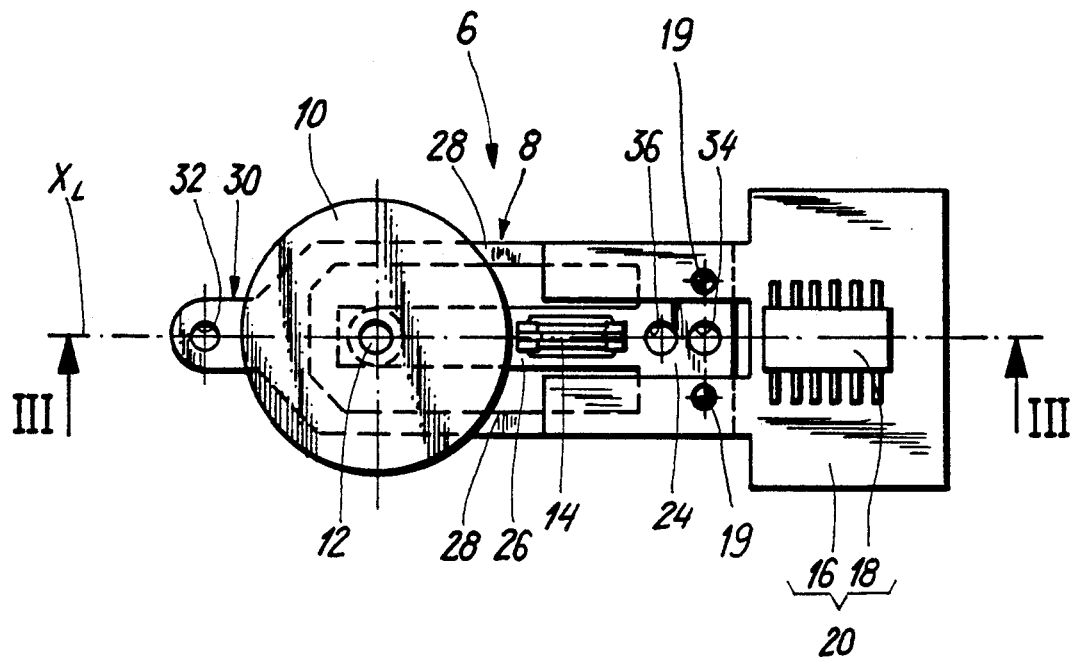
FIG. 2 is a view from above of the support of the sensor of FIG. 1 provided with various functional members and ready to be mounted on the frame.
Figure 3:
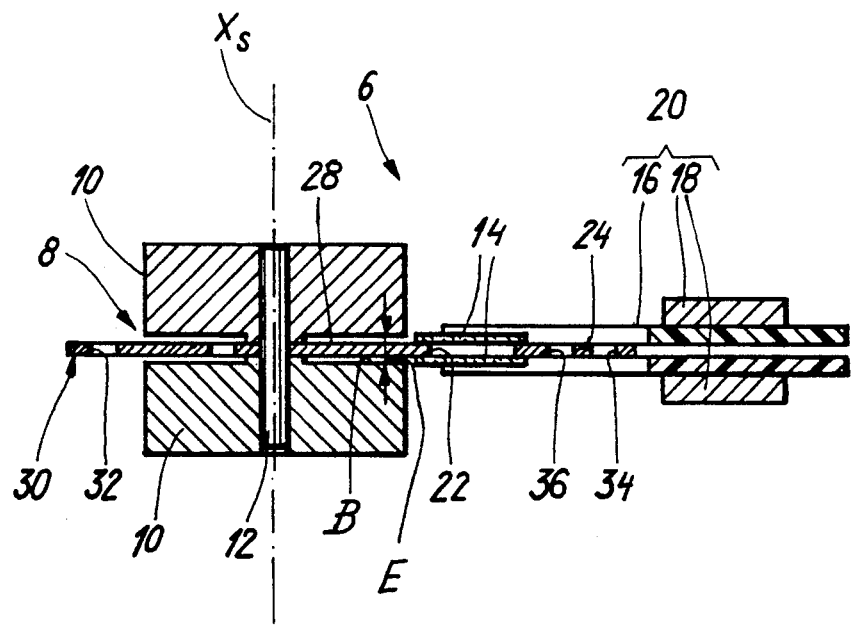
FIG. 3 is a sectional view along the line III—III of FIG. 2.

Referring firstly to FIG. 1, this shows one preferred embodiment of the measurement sensor of the invention designated by the general reference numeral 1.

This sensor 1 has a frame 2 which is composed of two shells, 2a and 2b respectively, of similar shape and designed to be assembled using fixing means, such as screws 4, only one of which has been shown in FIG. 1.

The frame 2 is adapted to receive a functional unit 6.

This functional unit comprises a support 8 one part at least of which is resiliently flexible under the influence of a physical parameter to be recorded or measured.

In this specific example, two half masses 10 connected together by an axle 12 driven therein, are fixed to the support 8. The axle 12 passes completely through the support 8 so that this support is sandwiched between the two half masses 10.

In addition, the support 8 also has two detection means 14. In the example shown the detection means are composed of two quartz resonators shaped like a double tuning fork mounted on both sides of the support 8. Each resonator 14 is electrically connected to an associated printed circuit board 16 having electronic components 18 mounted on the surface thereof, only one of which has been shown here. The elements 16 and 18 constitute an electronic circuit 20.

The resonators 14 are connected to oscillating circuits, not provided with reference numerals, in a conventional manner, the resonance frequencies of which vary as a function of the flexion of the resonators and consequently as a function of the flexion of the support 8. The resonating circuits deliver signals which are treated and analysed in the electronic circuit 20. This delivers a variable signal as a function of the flexion of the support 8 and thus, in this example, of the acceleration undergone by the two half masses 10.

This embodiment therefore consists of two printed circuit boards 16 arranged one on each side of the support 8 and fixed thereto by means of press studs 19 or other similar means such as screws, not shown.

It should also be noted that at the area where the resonators 14 are mounted, the support 8 has under each of its detection or resonating means 14 a corresponding aperture 22 permitting the resonator 14 to vibrate freely.

In this specific example, the support 8 has a base 24 which is adapted to be mechanically fixed to the frame 2. Extending from this base 24 is a member 26 of substantially elongated shape which is particularly capable of resiliently flexing in relation to the base 24. This elongated member has the general shape of a beam of rectangular section, mounted in the example shown overhanging the frame 2. This beam is adapted to deflect in sensitive manner in one direction perpendicular to its large faces, under the influence of external stress, and this along a sensitive axis Xs to trigger the detection means 14.

In this embodiment the measurement sensor 1 and more specifically the support 8 has two arms 28 which are connected together to form a closed frame about the elongated member or beam 26.

The two arms 28 extend in a direction substantially parallel to that of the elongated member 26 from the base 24 and beyond the free extremity of the elongated member 26.

The two arms 28 are thus connected together beyond the free extremity of the elongated member 26 by means of a junction part 30 provided with a positioning opening 32.

It should be noted that the base 24, the elongated member 26, the two arms 28 as well as the junction part 30 are all provided in the same plan to form a single member and constitute the support 8 in such a way that the latter can advantageously be made of a stamped metal sheet. The support 8 can thus be mass produced using simple operations and at low cost.

It will be noted that the stamping operation needed for this manufacturing process does not require any additional stage to prepare the support 8 provided with the elongated member and the frame formed by the base 24, the junction part 30 and the two arms 28.

The base 24 also comprises a positioning opening 34 which is located, as is the positioning opening 32, on a longitudinal axis X1 of the beam 26, termed the positioning axis. The two positioning openings, 32 and 34 respectively, are located as far as possible from each other to ensure the correct positioning of the frame formed by the arms 28 and hence of the support 8 in the frame 2. The base 24 also has a passage opening 36 adapted to receive a screw 38 to fix the support to the lower shell 2b of the frame 2. Interposed between the screw 38 and the base 24 is a collar 23 which bears against the base 24 to coincide with the edge which overhangs the elongated member or beam 26.

The two positioning openings 32 and 34 are so arranged as to cooperate respectively with the studs 40 and 42 designed to fit precisely into the upper and lower shells 2a and 2b.

The positioning means 32, 34, 40 and 42 make it possible to adjust with a predetermined play the two half masses 10 inside the two cavities 44 and 46 provided in shells 2b and 2a respectively.

It will thus be noted that the two half masses 10 constitute a single mass having two parts assembled by an axle 12 between which is provided a space E into which the two arms 28 partially extend. This space E defines on both sides of the arms 28, and between each of these and the two half masses 10, a play determining the maximum flexion amplitude of the elongated member 26.

It will thus be understood that, before it is mounted in the frame 2, the functional unit 6 is protected against unwanted flexions which the elongated member 26 could undergo and which could lead to the damage or breakage of the resonators 14 because the amplitude of flexion of the elongated member 26 is limited to a predetermined threshold by the mechanical contact between the opposing faces of, respectively, the half masses 10 and the arms 28 forming the stop and counter-stop respectively.

The stop means are thus formed by the two half masses 10 which are integral with the elongated member 26.

Referring now to FIGS. 4 to 7, these show two embodiments of a support 8 of the invention in which those elements identical to those previously described have been designated with the same reference numerals.

Figure 4:
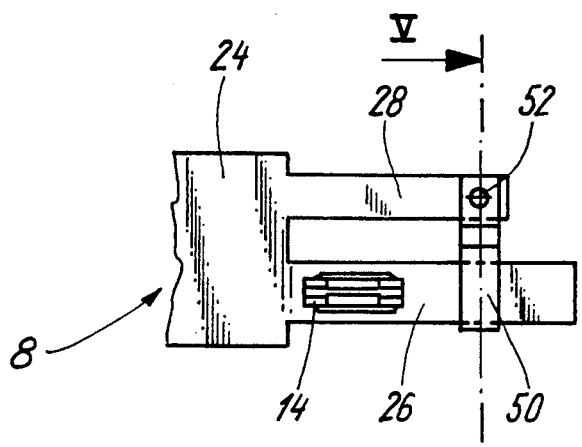
FIG. 4 shows a second embodiment of the stop means and counter-stop means of the sensor of the invention.
Figure 5:
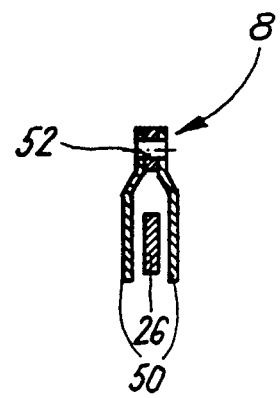
FIG. 5 is a sectional view along the line V—V of FIG. 4.

Referring in particular to FIGS. 4 and 5, the support 8 has a single arm 28 which has two wings 50 extending from this latter and which are mounted on this arm by means of a press stud 52, these parts thus being mechanically fixed to the free extremity of the arm 28. The two wings 50 extend along planes substantially parallel to that of the elongated member 26, in a direction perpendicular thereto and alongside this elongated member to limit its displacement in both directions during flexion thereof. The elongated member 26 and the two wings 50 thus form the stop and counter-stop respectively.

It follows that in an even more simplified embodiment it would be sufficient to have only one wing which would limit movement of the elongated member 26 in a single direction. In another embodiment, the wing(s) are integral with the arm 28 and are provided therein by stamping and then bending in the appropriate manner.

Figure 6:
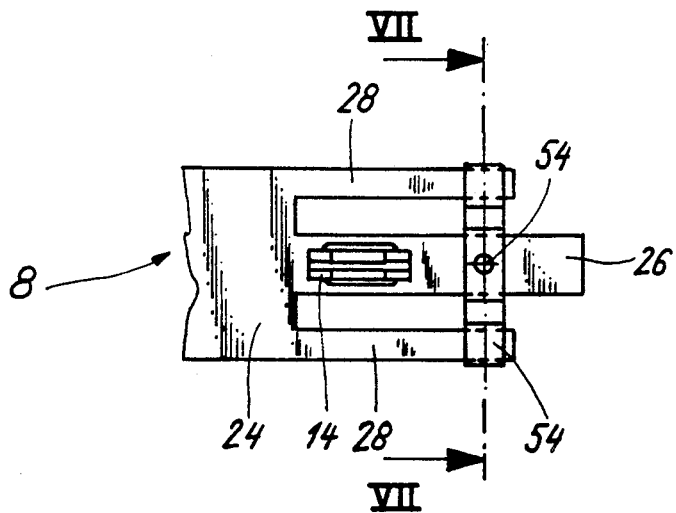
FIG. 6 is a similar view to FIG. 4, but representing a third embodiment of the stop means and counter-stop means of the sensor of the invention.
Figure 7:
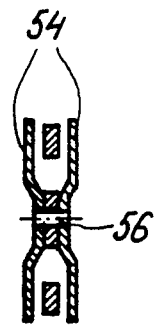
FIG. 7 is a sectional view along the line VII—VII of FIG. 6.

Referring now to FIGS. 6 and 7, the elongated member 26 comprises two extensions 54 which are mounted by means of a press stud 56 close to the free extremity of the elongated member 26 and the two arms 28 which are integral with the base 24 extending partially between the wings 54.

A simplified embodiment has one extension 54 limiting the movement of the beam 10 in a single direction.

In another embodiment the extension(s) is/are integral with the beam 26 and is/are bent in appropriate manner to extend alongside the arm(s) 28.

It will also be noted that the extensions 54 constitute stop means whereas the arms 28 constitute associated counter-stop means.

It emerges from all these embodiments that the stop means and counter-stop means are integral with the support 8 and are mechanically independent of the frame 2 with the result that the stop means and the counter-stop means limit the flexion of the support 8 before it is fitted to the frame 2. The detection means 14 can consequently be effectively protected during the handling that precedes the operations to fit the functional unit 6 in its frame 2.

What is claimed is:

1. A measurement sensor for measuring a physical parameter, said sensor comprising:
    a frame,
    at least one support, said support having a base adapted to be mounted on said frame and from which extends an elongated member for flexing in relation to the base under the action of said physical parameter,
    a mass fixed to the elongated member, said frame comprising a cavity closely surrounding the mass,
    detection means integral with said elongated member for supplying a signal representative of said physical parameter, and
    means for limiting the flection of said elongated member in each of two opposite directions, the limiting means comprising at least one arm integral with the base and extending parallel to and adjacent to the elongated member, a portion of said arm also extending into a space provided in said mass and defined by opposing parts thereof so as to limit said flection.

2. A measurement sensor according to claim 1 wherein the elongated member is formed by an overhanging beam extending from the base, and wherein said mass is formed by two assembled parts between which said space is provided and into which said arm extends, this space defining the amplitude of maximum flection of said elongated member.

3. A measurement sensor according to claim 2 which comprises two arms connected together by a junction piece to form a closed frame about the elongated member.

4. A measurement sensor according to claim 3 wherein the mass comprises an annular slot into which the junction piece substantially extends.

5. A measurement sensor according to claim 1 wherein one extremity of one arm projects beyond the mass and has a positioning orifice cooperating with a positioning means on the frame.

6. A measurement sensor according to claim 1 wherein said at least one arm is of the same material as the base.

7. A measurement sensor according to claim 1 wherein the support is made from a stamped metal sheet.

8. A measurement sensor of a physical parameter, said sensor comprising:
    a frame,
    at least one support, said support having a base adapted to be mounted on said frame and from which extends an elongated member for flexing in relation to the base under the action of said physical parameter,
    detection means integral with said elongated member for providing a signal representative of sad physical parameter, and
    means for limiting the flection of said elongated member wherein the limiting means comprises at least one arm integral with the base and at least one wing integral with said ram, said arm extending parallel to and adjacent to the elongated member, and said wing extending from said arm so as to be engaged by said elongated member to limit its flection.

9. A measurement sensor according to claim 8 which has two wings extending on either side of the elongated member to limit its flection in opposite directions of displacement.

10. A measurement sensor according to claim 8 wherein said elongated member comprises at least one extension integral therewith, said extension extending opposite to said arm.

11. A measurement sensor according to claim 8 wherein said elongated member comprises at least one extension portion which is located under another portion of said member, said extension portion extending opposite to said arm.

12. A measurement sensor of a physical parameter, said sensor comprising:
    a frame,
    at least one support, said support having a base adapted to be mounted on said frame and from which extends an elongated member for flexing in relation to the base under the action of said physical parameter,
    detection means integral with said elongated member for providing a signal representative of said physical parameter, and
    means for limiting the flection of said elongated member wherein said limiting means comprising at least one arm integral with the base and at least one wing located on the arm, said arm extending parallel to and adjacent to the elongated member, and said wing extending from said arm so as to be engaged by said elongated member to limit its flection.

13. A measurement sensor according to claim 12 which has two wings extending on either side of the elongated member to limit its flection in opposite directions of displacement.

14. A measurement sensor according to claim 12 wherein said elongated member comprises at least one extension integral therewith, said extension extending opposite to said arm.

15. A measurement sensor according to claim 12 wherein said elongated member comprises at least one extension portion which is located under another portion of said member, said extension portion extending opposite to said arm.

* * * * *

UNITED STATES PATENT AND TRADEMARK OFFICE
CERTIFICATE OF CORRECTION

PATENT NO.   :   5,269,185
DATED        :   December 14, 1993
INVENTOR(S)  :   RAYMOND FROIDEVAUX It is certified that error appears in the above-identified patent and that said Letters Patent is hereby corrected as shown below:

Column 6, line 27, change "sad" to --said--; and line 32, change "ram" to --arm--.

Signed and Sealed this

Twenty-fourth Day of May, 1994

Attest:

BRUCE LEHMAN

*Attesting Officer*          *Commissioner of Patents and Trademarks*